US009115516B2

(12) United States Patent
Hwang et al.

(10) Patent No.: US 9,115,516 B2
(45) Date of Patent: Aug. 25, 2015

(54) CAMERA STRUCTURE FOR ELECTROMAGNETIC LOCK

(76) Inventors: Shih-Ming Hwang, Irvine, CA (US); Liang-Lun Hwang, Irvine, CA (US)

( * ) Notice: Subject to any disclaimer, the term of this patent is extended or adjusted under 35 U.S.C. 154(b) by 679 days.

(21) Appl. No.: 13/430,688

(22) Filed: Mar. 27, 2012

(65) Prior Publication Data

US 2013/0258101 A1 Oct. 3, 2013

(51) Int. Cl.

*H04N 7/18* (2006.01)
*E05C 19/16* (2006.01)
*G08B 13/196* (2006.01)

(52) U.S. Cl.

CPC ......... *E05C 19/166* (2013.01); *G08B 13/19619* (2013.01)

(58) Field of Classification Search

CPC ................... G08B 13/19617; G08B 13/19621; G08B 13/19623; G08B 13/1963; G08B 13/19632; G08B 13/19619; E05C 19/166

USPC ............................................ 348/143, E7.085

See application file for complete search history.

(56) References Cited

U.S. PATENT DOCUMENTS

| | | | | |
|---|---|---|---|---|
| 5,376,910 | A * | 12/1994 | Geringer et al. | 335/278 |
| 2007/0262592 | A1* | 11/2007 | Hwang et al. | 292/251.5 |
| 2011/0018680 | A1* | 1/2011 | Lai et al. | 340/3.1 |
| 2013/0127260 | A1* | 5/2013 | Webb et al. | 307/112 |

OTHER PUBLICATIONS

Specification for DE8310 published in 2010.*

* cited by examiner

*Primary Examiner* — Mohammed Rahaman
(74) *Attorney, Agent, or Firm* — Chun-Ming Shih

(57) ABSTRACT

In a camera structure for an electromagnetic lock, the electromagnetic lock based on aluminum extrusion framing for development of one assembly is divided into an electromagnetic lock and a camera structure. The electromagnetic lock includes a frame, a wire harness space, an electromagnetic core, a plate body, an electromagnetic cover and a wire harness cover; the camera structure comprises a U-shaped frame, a plate body, a camera cover and side blocks.

9 Claims, 8 Drawing Sheets

CAMERA STRUCTURE FOR ELECTROMAGNETIC LOCK

BACKGROUND OF THE INVENTION

1. Field of the Invention

The present invention relates to an electromagnetic lock, especially to an electromagnetic lock comprising one camera, which is flexibly installed according to user's requirements, and featuring a monitoring function. A camera structure for an electromagnetic lock in the present invention is characteristic of multiple functions such as security and convenience.

2. Description of the Prior Art

Continual technical improvements have made electromagnetic locks ubiquitous around the world, both for office buildings and general residences.

Those electromagnetic locks are designed and produced by different manufacturers, and are available in the market with a variety of features such as robust structure, aesthetic appearance, vandal resistance, power saving, easy production, and non-polluting (e.g., air, noise, radiation, glue refuse, etc.), the latter of which satisfies environmental requirements and promotes competitiveness in markets where environmental concerns are important.

An electromagnetic lock's original function is to securely lock a door or other opening into a protected building or room. However, a conventional electromagnetic lock is often installed along with additional accessories such as monitoring devices, sensors, and so on on a doorframe or on a wall for security and convenience. Electromagnetic locks along with many other related accessories require holes be drilled on the doorframe or the wall which can deteriorate the building's original structure and consume more time for the installer, resulting in additional cost for the purchase of any accessory.

In general, the design of a conventional electromagnetic lock does not comply with the diversified requirements of a modern society. However, it is believed that an electromagnetic lock integrated with the functions of other accessories will be popular with consumers and help spur manufacturers' research & development.

In order to solve the above-mentioned problems, the present invention offers an electromagnetic lock with a camera structure whose installation is based on actual requirements for flexible adjustment.

SUMMARY OF THE INVENTION

The present invention of a camera structure for an electromagnetic lock is designed to be an electromagnetic lock in which one camera is flexibly installed. The present invention of a camera structure for an electromagnetic lock is divided into an electromagnetic lock and a camera structure. The electromagnetic lock comprises a frame, a wire harness space, an electromagnetic core, a plate body, an electromagnetic cover and a wire harness cover; the camera structure comprises a U-shaped frame, a plate body, a Camera cover and side blocks. The object of the present invention is to provide a camera structure for an electromagnetic lock without multiple drawbacks of an electromagnetic lock manufactured by the prior art, such as having no frame for the installation of a camera or requiring multiple holes in a doorframe or wall when installing multiple products, which increases the time, costs, and potential destruction when these accessories are installed. Having made all efforts to research and test possible solutions, the inventor has finally designed the present invention of a camera structure for an electromagnetic lock.

The purpose of the present invention is to provide a camera structure for an electromagnetic lock. To this end, the electromagnetic lock based on aluminum extrusion framing for development of one assembly comprises: a frame with frame mounting holes and a frame ellipse hole on one flank; an electromagnetic core; a plate body with plate mounting holes and a plate ellipse hole corresponding to the frame for the plate body fixed on a doorframe; an electromagnetic cover facing the electromagnetic core and fixed on a door panel; a wire harness cover with wire harness cover mounting holes; a plurality of side blocks, each of which has grooves on one flank and side block mounting holes and a cover mounting hole wherein the side block mounting holes align the frame mounting holes and the cover mounting hole aligns the wire harness cover mounting hole; and a camera structure for the installation of one camera to be installed with connection to the electromagnetic lock.

In this regard, the frame mounting holes align with the plate mounting holes; the wire harness cover is assembled to the frame's one flank to which an electromagnetic core is adjacent; and both the plate body and the wire harness cover link the side block's two flanks in order to develop a wire harness space by means of three components thereof and the frame to accommodate the electromagnetic lock's wires.

Additionally, the camera structure further comprises: a U-shaped frame with frame mounting holes and a frame ellipse hole on one flank; a plate body which has both plate mounting holes and a plate ellipse hole corresponding to the U-shaped frame for the plate body and the electromagnetic lock fixed together on a doorframe; a camera cover with camera cover mounting holes and a camera opening; a plurality of side blocks, each of which has grooves on one flank, side block mounting holes, and a cover mounting hole wherein the side block mounting holes and the cover mounting hole align the frame mounting holes and the camera cover mounting hole, respectively.

In this regard, the plate body corresponds to and overlaps the U-shaped frame's one flank on which there is one frame ellipse hole; the side blocks align the frame mounting holes on the U-shaped frame for development of an opening side to which the camera cover is mounted for completion of the camera structure.

As indicated in previous descriptions about a camera structure for an electromagnetic lock, the side block mounting holes align the frame mounting holes or the frame mounting holes on the U-shaped frame for the frame or the U-shaped frame and the side block joined in place by hexagon socket cap screws.

In the present invention of a camera structure for an electromagnetic lock, the frame mounting holes and the cover mounting holes or one side block's side block mounting holes and the cover mounting holes are joined by screws for development of a wire harness space in which wires are accommodated.

The frame mounting holes on the U-shaped frame align the side block mounting holes to develop an opening side for one space used to accommodate a camera.

The camera structure is designed for one camera whose lens can be installed facing frontward or backward through a structural adjustment.

The present invention of a camera structure for an electromagnetic lock is based on aluminum extrusion framing for development of one assembly which is provided with space for a monitoring-oriented camera which can be installed facing frontward or backward according to a user's situation.

In contrast to prior art, the present invention of a camera structure for an electromagnetic lock is equipped with a camera structure built into a monitoring-oriented electromagnetic lock which allows a camera to be flexibly installed facing frontward or backward and which features multiple functions or advantages such as installation of one camera, monitoring, convenience and competitiveness in a market.

The advantages and spirit for the present invention can be further realized by means of descriptions and drawings hereinafter.

These features and advantages of the present invention will be fully understood and appreciated from the following detailed description of the accompanying drawings.

DETAILED DESCRIPTION OF THE PREFERRED EMBODIMENT

The present invention discloses a camera structure for an electromagnetic lock. The electromagnetic lock based on aluminum extrusion framing for development of a single assembly which is divided into an electromagnetic lock and a camera structure. The electromagnetic lock comprises a frame, a wire harness space, an electromagnetic core, a plate body, an electromagnetic cover, and a wire harness cover; the camera structure comprises a U-shaped frame, a plate body, a camera cover, and side blocks.

The present invention of an electromagnetic lock which is provided with a camera structure is effective in monitoring and providing security and has the characteristic of a camera flexibly installed according to a user's situation and delivers multiple functions such as installation of one camera, monitoring, security, convenience, and confidentiality all as part of a single installed device.

Figure 1:
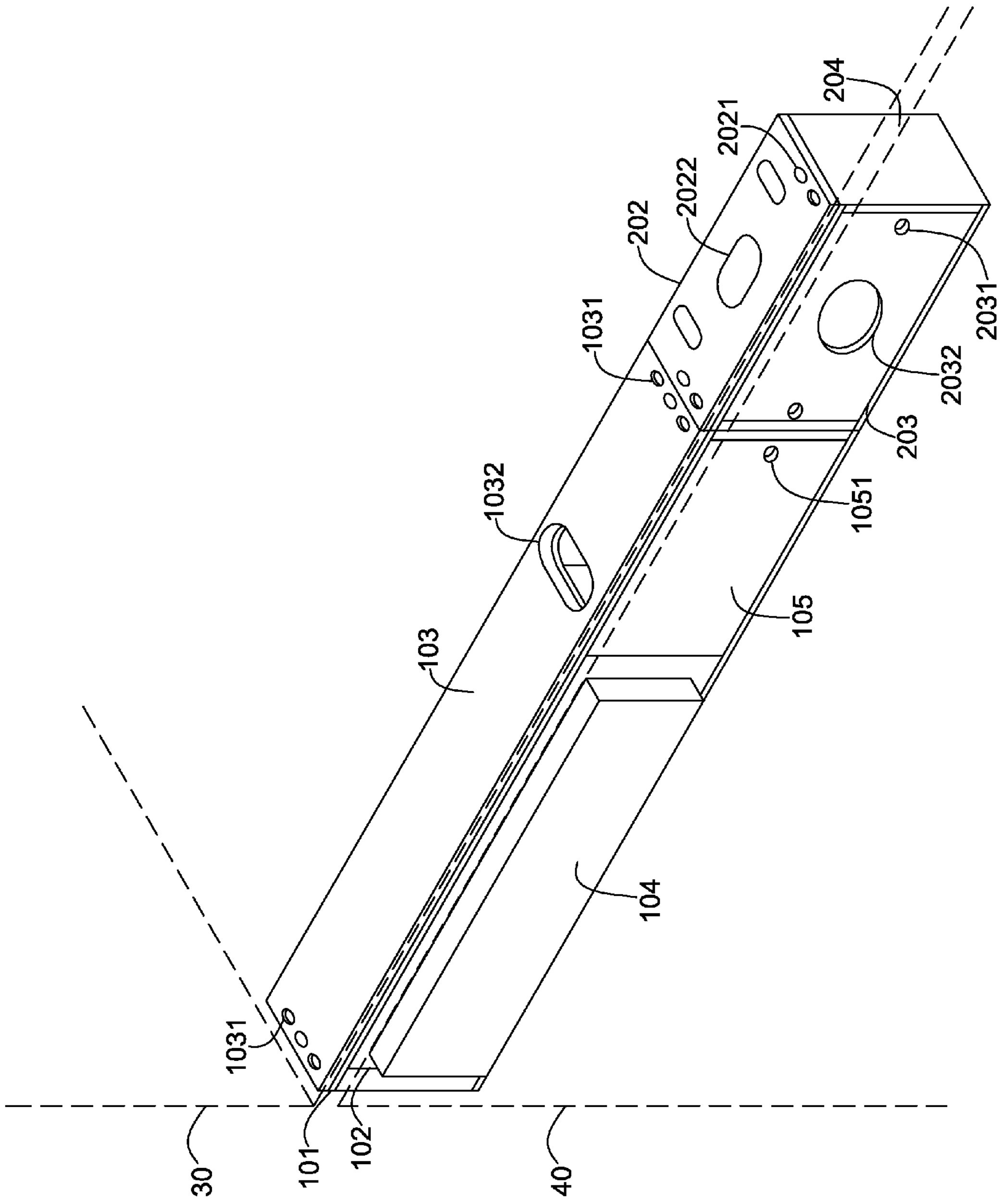
FIG. 1 is a schematic diagram of an electromagnetic lock.
Figure 2:
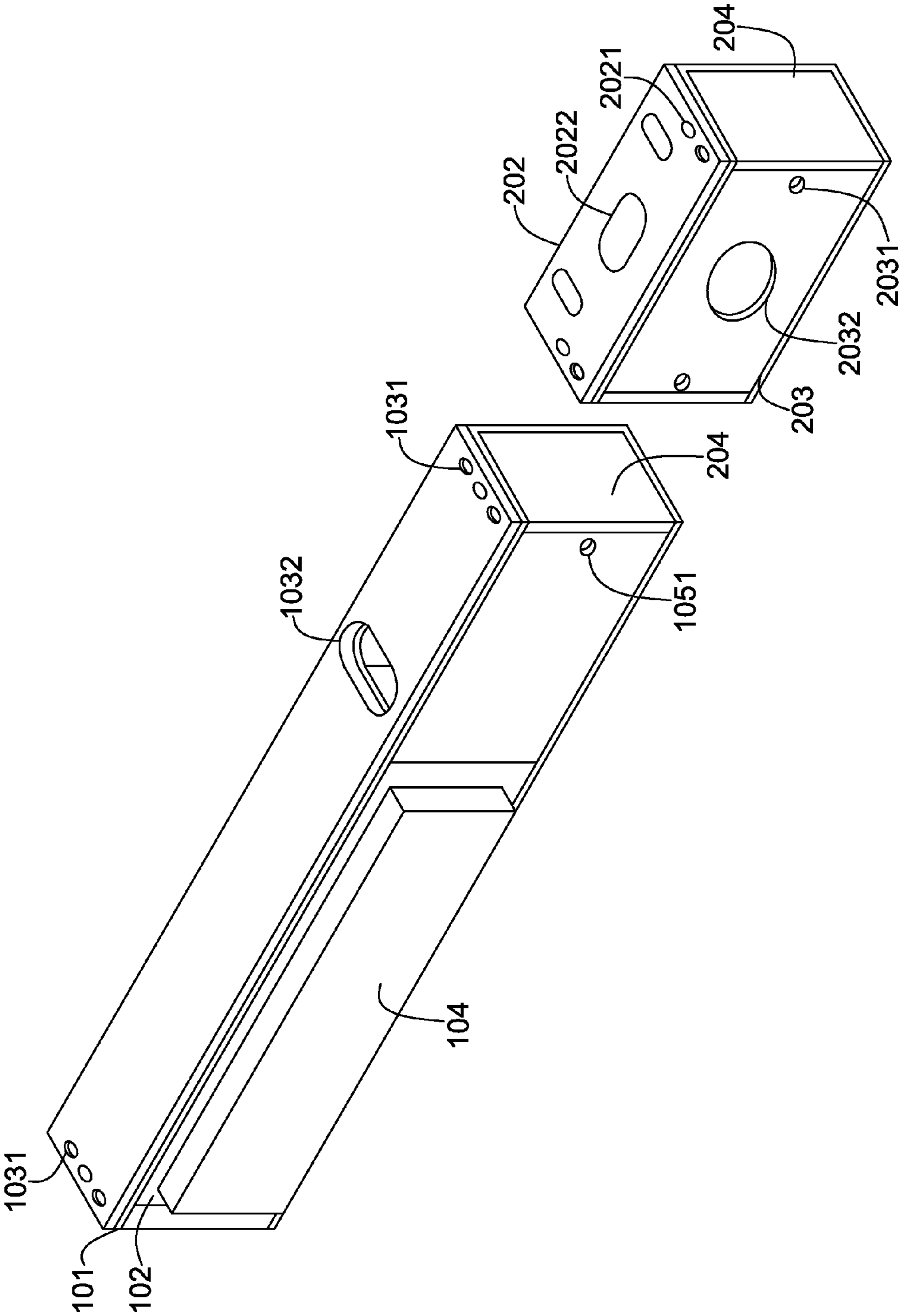
FIG. 2 is another schematic diagram of an electromagnetic lock.

Referring to FIG. 1 and FIG. 2 which illustrate two schematic diagrams of an electromagnetic lock in the present invention. As shown in FIG. 1 and FIG. 2, the present invention is to provide a camera structure for an electromagnetic lock. To this end, the electromagnetic lock based on aluminum extrusion framing for development of one assembly has both a plate body 103 and a plate body 202 fixed on a doorframe 30 and an electromagnetic cover 104 fixed on a door panel 40 which is opposite to an electromagnetic core 102.

Figure 3A:
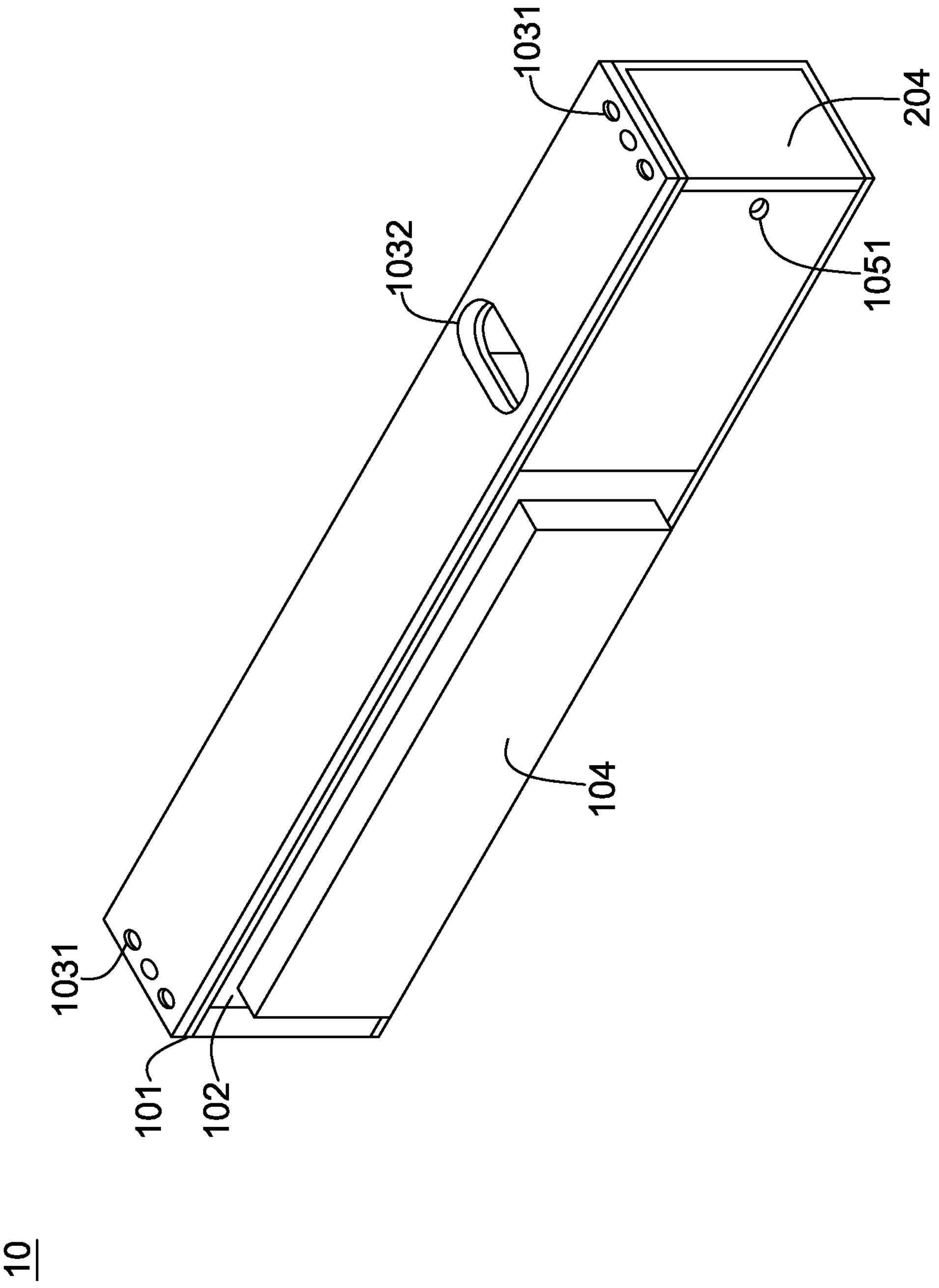
FIG. 3A is the perspective view of an electromagnetic lock.
Figure 3B:
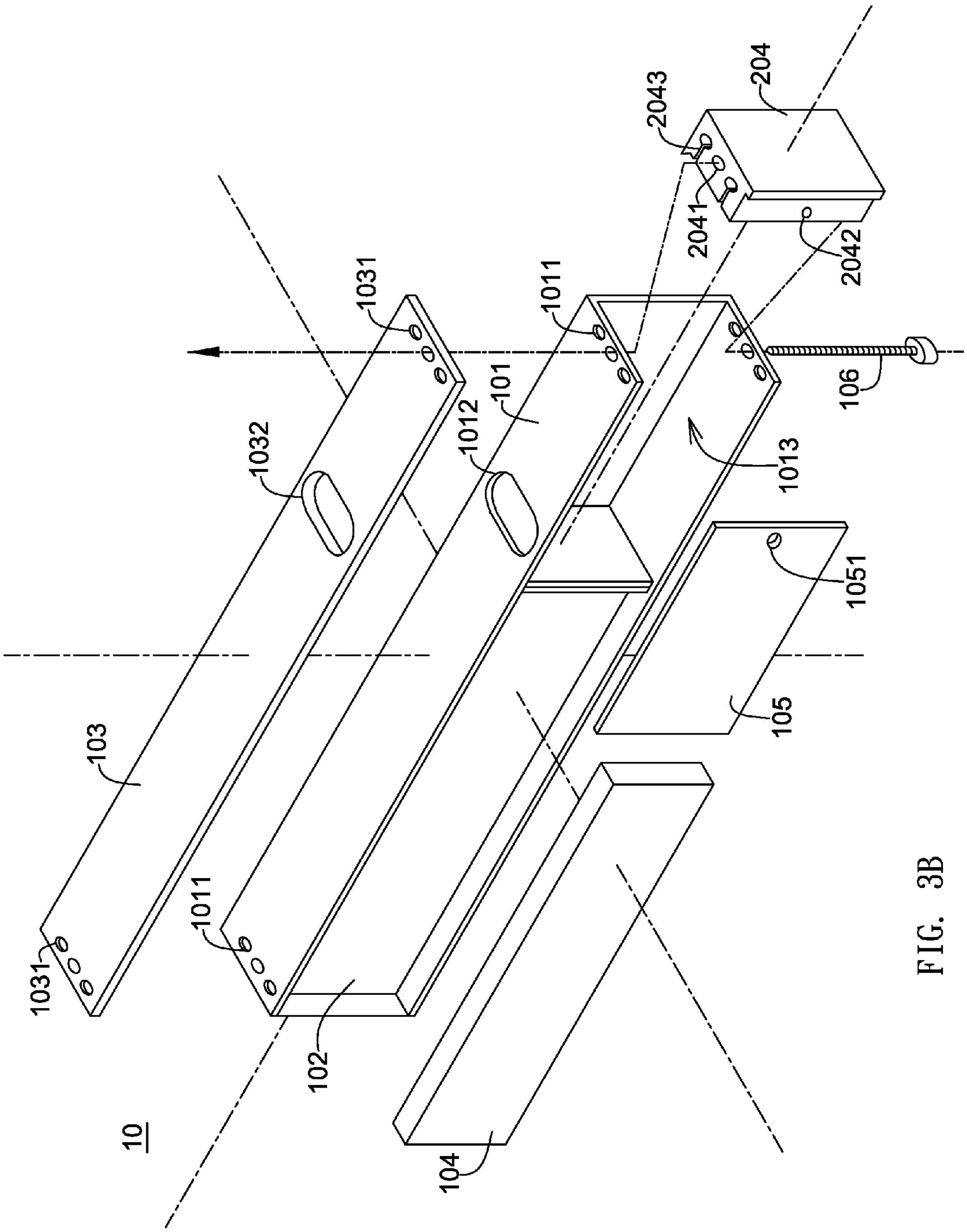
FIG. 3B is the exploded perspective view of an electromagnetic lock.

Referring to FIG. 3A and FIG. 3B which illustrate the perspective view of an electromagnetic lock (FIG. 3A) and the exploded perspective view of an electromagnetic lock (FIG. 3B). As shown in FIG. 3A and FIG. 3B, the electromagnetic lock 10 comprises: a frame 101 with frame mounting holes 1011, a frame ellipse hole 1012 on one flank and an electromagnetic core 102; a plate body 103 with both plate mounting holes 1031 and a plate ellipse hole 1032 corresponding to the frame 101 for the plate body 103 fixed on a doorframe; an electromagnetic cover 104 which is located at one flank facing the electromagnetic core 102 and fixed on a door panel; a wire harness cover 105 with a wire harness cover mounting hole 1051; a plurality of side blocks 204, each of which has grooves 2043 on one flank, side block mounting holes 2041 used to align the frame mounting holes 1011, and a cover mounting hole 2042 used to align the wire harness cover mounting hole 1051.

In this regard, the frame mounting holes 1011 align with the plate mounting holes 1031; the wire harness cover 105 links one flank of the frame 101 on which there is the electromagnetic core 102 installed; both the plate body 103 and the wire harness cover 105 join two flanks of the side block 204.

Figure 4A:
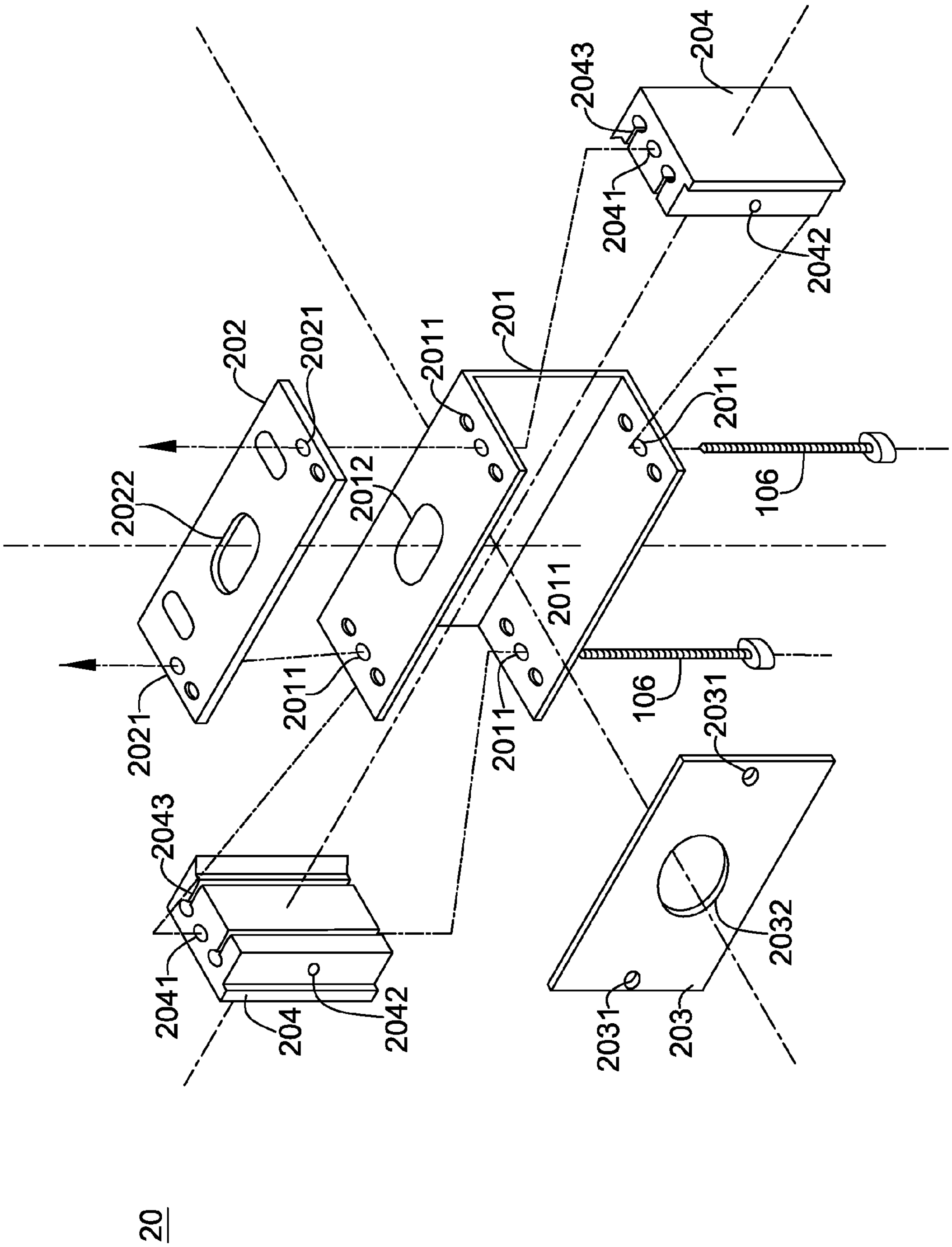
FIG. 4A is the exploded perspective view of a camera structure for an electromagnetic lock.
Figure 4C:
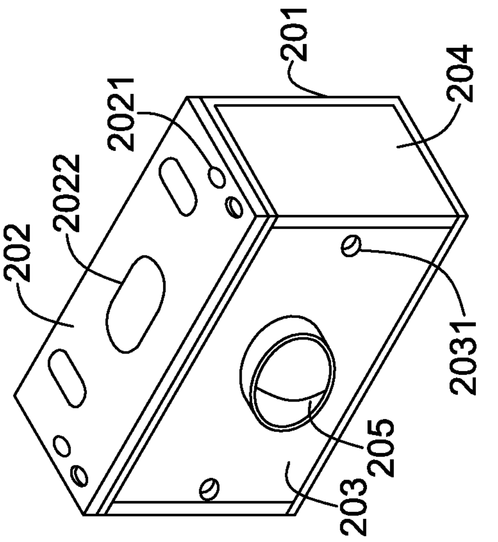
FIG. 4C is the perspective view of a camera structure for an electromagnetic lock in one embodiment.
Figure 4B:
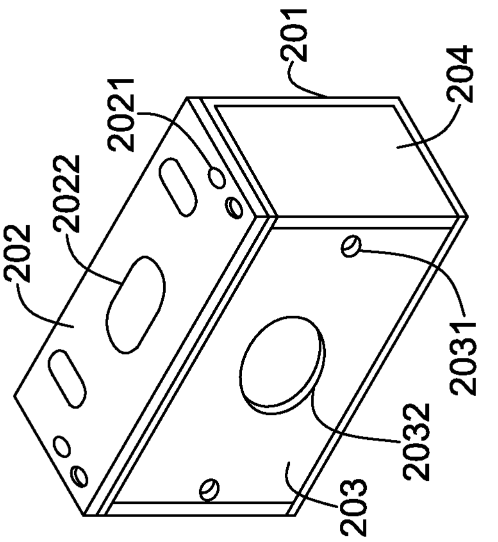
FIG. 4B is the perspective view of a camera structure for an electromagnetic lock.
Figure 4D:
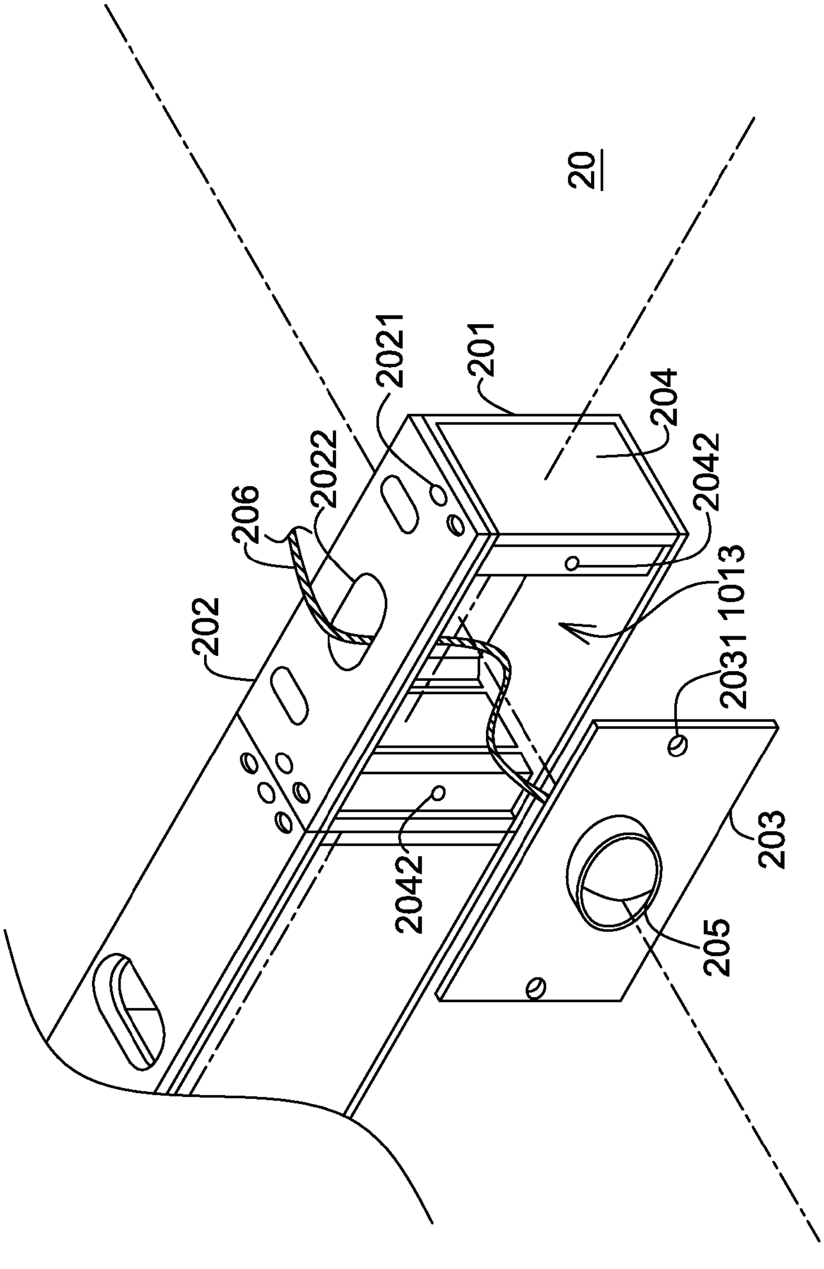
FIG. 4D is the exploded perspective view of a camera structure for an electromagnetic lock in one embodiment.
Figure 4E:
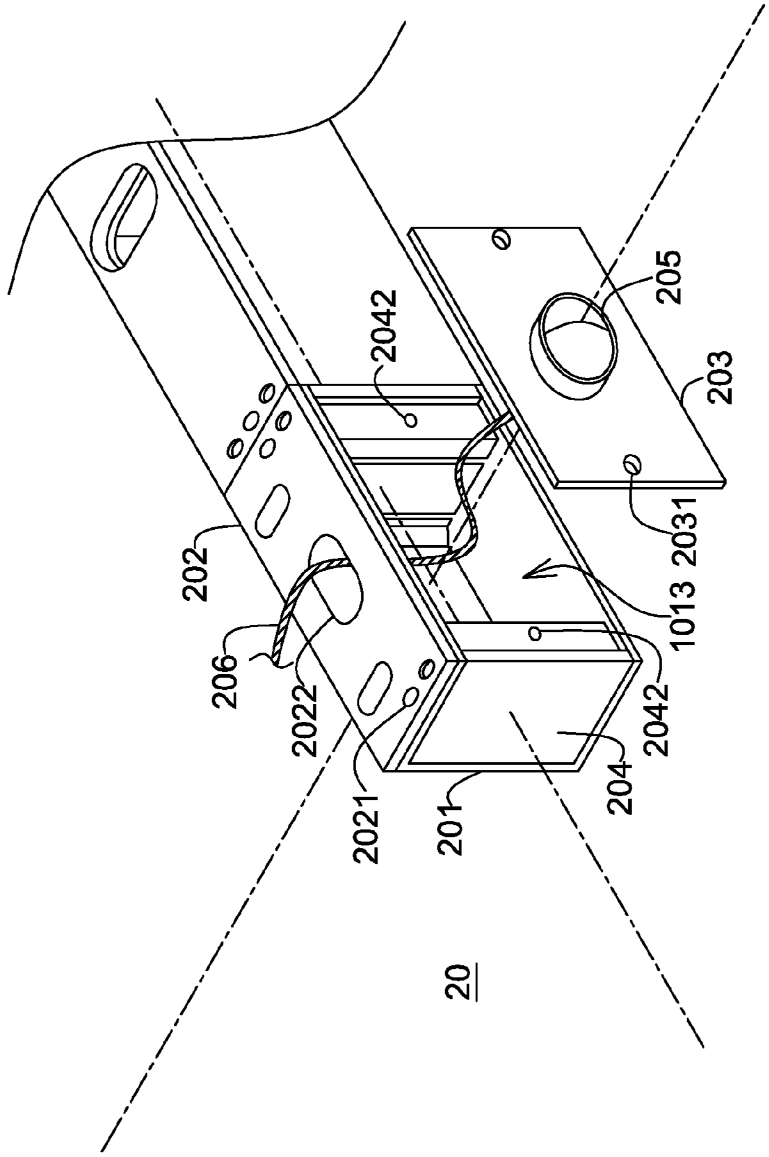
FIG. 4E illustrates another direction of a camera structure for an electromagnetic lock during installation.

Referring to FIG. 4A and FIG. 4D which illustrate the exploded perspective view of one camera structure for an electromagnetic lock (FIG. 4A) and the exploded perspective view of one camera structure for an electromagnetic lock in one embodiment (FIG. 4D).

As shown in FIG. 4A and FIG. 4D, the camera structure 20 further comprises: a U-shaped frame 201 with frame mounting holes 2011 and a frame ellipse hole 2012 on one flank; a plate body 202 which is provided with plate mounting holes 2021 and a plate ellipse hole 2022 corresponding to the U-shaped frame 201 and is fixed on a doorframe; a camera cover 203 with camera cover mounting holes 2031 and a camera opening 2032; and a plurality of side blocks 204, each of which has grooves 2043 at one flank, side block mounting holes 2041, and a cover mounting hole 2042, wherein the side block mounting holes 2041 align the frame mounting holes 2011 for coupling and the cover mounting hole 2042 align the camera cover mounting hole 2031.

In this regard, the plate body 202 overlaps one flank of the U-shaped frame 201 on which there is the frame ellipse hole 2012; the side blocks 204 are screwed to the U-shaped frame 201 through the frame mounting holes 2011 for these components thereof fixed in place and development of an opening side which is capped by the camera cover 203.

In one embodiment, both the camera cover 203 and the side blocks 204 are combined by means of the camera cover mounting holes 2031, the cover mounting holes 2042 on the side blocks, and screw bolts for the camera cover 203 and the side blocks 204 fixed in place.

In another embodiment, the frame 101, the side block 204, and the plate body 103 are fixed in place by a screw or similar means 106 from the bottom to securely combined the three components and fix them on the doorframe 30. In this regard, the electromagnetic cover 104 installed on the door panel 40 faces the electromagnetic core 102 in the frame 101.

In another embodiment, the U-shaped frame 201, the side blocks 204, and the plate body 202 corresponding to the U-shaped frame 201 are fixed in place by a screw or similar means 106 from the bottom to securely combined the three components and fix them on the doorframe 30.

In the electromagnetic lock hereinabove, the screw or similar means 106 could be hexagon socket cap screws, screw bolts, or anchor bolts.

Referring to FIG. 3B which is the exploded perspective view of one electromagnetic lock. As shown in FIG. 3B, the electromagnetic lock in the present invention has the frame mounting holes 1011 and their corresponding plate (SEE PAGE 8, LINE 8) mounting holes 1031 or the side block mounting holes 2041 and their corresponding plate (SEE PAGE 8, LINE 8) mounting hole 1031 are fixed in place by a screw or similar means 106 to form a wire harness space 1013 inside of which wires may be placed.

Referring to FIG. 4B and FIG. 4C which illustrate the perspective view of a camera structure for an electromagnetic lock (FIG. 4B) and the perspective view of a camera structure for one electromagnetic lock (FIG. 4C) in one embodiment. As shown in FIG. 4B and FIG. 4C, the frame mounting holes 2011 on the U-shaped frame 201 align the side block mounting holes 2041 to develop an opening side for a camera 205 accommodated inside.

In this regard, the camera structure 20 is used to accommodate the camera 205 and connect to the electromagnetic lock 10.

Referring to FIG. 4D which is the exploded perspective view of a camera structure for an electromagnetic lock in one embodiment. As shown in FIG. 4D, the camera cover 203 is mounted and screwed to the corresponding opening side 1013 for development of the camera structure 20.

In one embodiment, the camera structure 20 for an electromagnetic lock in the present invention can be installed facing frontward or backward through structural adjustment.

In another embodiment, the U-shaped frame 201 based on an adjustable user requirement for one product can be installed facing frontward or backward.

The camera structure for an electromagnetic lock in the present invention is developed and assembled on the aluminum extrusion framing basis and provided with a monitoring-oriented camera structure in which a camera can be installed facing frontward or backward according to a user's situation.

It can be seen from previous descriptions that the present invention of a camera structure for an electromagnetic lock is equipped with a camera structure in which a camera accommodated in the monitoring-oriented electromagnetic lock is installed facing frontward or backward according to structural adjustment and has multiple characteristics such as installation of a camera, monitoring, convenience, and competitiveness in a market.

In summary, the present invention of a camera structure for an electromagnetic lock as an invention with one camera installed is effective in monitoring, security, convenient installation, and high practicality.

The preferred embodiments for characteristics and spirit of the present invention clearly described are examples to embody the present invention only. It must be stressed that the present invention is not restricted by the disclosed embodiments. In contrast, all changes or equivalent arrangements should be rationally covered by appended claims of the present invention.

Many changes and modifications in the above described embodiment of the invention can, of course, be carried out without departing from the scope thereof. Accordingly, to promote the progress in science and the useful arts, the invention is disclosed and is intended to be limited only by the scope of the appended claims.

What is claimed is:

1. An assembly structure for an electromagnetic lock with a camera structure, which is based on aluminum extrusion framing for development of one assembly comprises:

the electromagnetic lock having:

a frame with a first set of frame mounting holes, a first frame ellipse hole opened on one flank and an electromagnetic core;

a first plate body which has a first set of plate mounting holes and a first plate ellipse hole corresponding to the frame and is fixed on a doorframe of a door;

an electromagnetic cover adjacent to the electromagnetic core and fixed on a door panel of the door;

a wire harness cover with wire harness cover mounting hole opened;

a first set of side blocks, each of which has grooves and side block mounting holes, wherein said side block mounting holes align with said first set of frame mounting holes of the frame for coupling, at least one of the first set of side blocks have a cover mounting hole wherein said cover mounting hole align with said wire harness cover mounting hole, and wherein said first set of frame mounting holes of the frame align with said first set of plate mounting holes of the first plate body, said wire harness cover is mounted to said frame's one flank on which said electromagnetic core is installed, said first plate body and said wire harness cover link two facets of at least one of the side block of the first set of side blocks; and the camera structure which is connected to said electromagnetic lock and the camera structure having:

an accommodation space for a camera;

a U-shaped frame which has a second set of frame mounting holes and a second frame ellipse hole on one flank of the U-shaped frame;

a second plate body which has a second set of plate mounting holes and a second plate ellipse hole corresponding to said U-shaped frame and is fixed on said doorframe;

a camera cover with camera cover mounting holes and a camera opening;

a second set of side blocks each having grooves, side block mounting holes and camera cover mounting hole, wherein said side block mounting holes and said camera cover mounting hole for each of the side block of the second set of side blocks align with the frame mounting holes and said camera cover mounting holes of the U-shaped frame, respectively;

wherein said second plate body corresponds to and overlaps on said U-shaped frame's flank on which said second frame ellipse hole is opened, and said second sets of side blocks link flanks of said U-shaped frame via frame mounting holes of the U-shaped frame for development of an opening side to which said camera cover is mounted.

2. The assembly structure for the electromagnetic lock with the camera structure according to claim 1, wherein said frame, one of the side block of said first set of side blocks and said first plate body are penetrated and joined by a holder unit bottom-up for these three components thereof fixed on said doorframe.

3. The assembly structure for the electromagnetic lock with the camera structure according to claim 2, wherein said holder units can be hexagon socket cap screw, screw bolt, or anchor bolt.

4. The assembly structure for the electromagnetic lock with the camera structure according to claim 1, wherein said electromagnetic cover is installed on said door panel and faces said electromagnetic core in said frame.

5. The assembly structure for the electromagnetic lock with the camera structure according to claim 1, wherein said U-shaped frame, one of the side block of said second set of side blocks, and said second plate body corresponding to said U-shaped frame are passed through and joined by a holder unit bottom-up for these three components thereof fixed on said doorframe.

6. The assembly structure for the electromagnetic lock with the camera structure according to claim 1, wherein said first set of frame mounting holes and said cover mounting hole as well as said side block mounting holes of the first set of side blocks and said wire harness cover mounting holes are joined by screw bolts for development of a space accommodating the wire harness.

7. The assembly structure for the electromagnetic lock with the camera structure according to claim 1, wherein said camera structure can be installed facing frontward or backward.

8. The assembly structure for the electromagnetic lock with the camera structure according to claim 1, wherein said U-shaped frame can be installed facing frontward or backward.

9. An assembly structure for an electromagnetic lock with a camera structure comprises:

the electromagnetic lock having:

a frame with a first set of frame mounting holes, a first frame ellipse hole opened on one flank and an electromagnetic core;

a first plate body which has a first set of plate mounting holes and a first plate ellipse hole corresponding to the frame and is fixed on a doorframe of a door;

an electromagnetic cover adjacent to the electromagnetic core and fixed on a door panel of the door;

a wire harness cover with wire harness cover mounting hole opened;

a first set of side blocks, each of which has grooves and side block mounting holes, wherein said side block mounting holes align with said first set of frame mounting holes of the frame for coupling, at least one of the first set of side blocks have a cover mounting hole wherein said cover mounting hole align with said wire harness cover mounting hole, and wherein said first set of frame mounting holes of the frame align with said first set of plate mounting holes of the first plate body, said wire harness cover is mounted to said frame's one flank on which said electromagnetic core is installed, said first plate body and said wire harness cover link two facets of at least one of the side block of the first set of side blocks; and the camera structure which is connected to said electromagnetic lock and the camera structure having:

an accommodation space for a camera;

a U-shaped frame which has a second set of frame mounting holes and a second frame ellipse hole on one flank of the U-shaped frame;

a second plate body which has a second set of plate mounting holes and a second plate ellipse hole corresponding to said U-shaped frame and is fixed on said doorframe;

a camera cover with camera cover mounting holes and a camera opening;

a second set of side blocks each having grooves, side block mounting holes and camera cover mounting hole, wherein said side block mounting holes and said camera cover mounting hole for each of the side block of the second set of side blocks align with the frame mounting holes and said camera cover mounting holes of the U-shaped frame, respectively;

wherein said second plate body corresponds to and overlaps on said U-shaped frame's flank on which said second frame ellipse hole is opened, and said second sets of side blocks link flanks of said U-shaped frame via frame mounting holes of the U-shaped frame for development of an opening side to which said camera cover is mounted.

* * * * *